3,080,235
PROCESS FOR MAKING MILK POWDER
Adrian Z. Hodson and Carl B. Miller, Greenville, Ill., assignors to Pet Milk Company, St. Louis, Mo., a corporation of Delaware
No Drawing. Filed May 13, 1960, Ser. No. 28,840
11 Claims. (Cl. 99—56)

This invention relates to a fat containing milk powder and to a process for making same. In particular, it relates to a whole milk powder which dissolves readily even in cold water by stirring slightly with a spoon, after which it is ready for immediate use. The invention further relates to a process for making said cold water soluble whole milk powder.

Present dried fat containing milk powders, particularly dried whole milk powders tend to deteriorate upon storage, often becoming rancid or stale and getting a musty or fish-like flavor. Another objectionable characteristic of present whole milk powders is their tendency to cake and become insoluble when stored for an appreciable period.

Perhaps the biggest obstacle to widespread use of powdered whole milk is the difficulty encountered by the user when he or she attempts to redisperse the powder in water, particularly cold water. Ordinary spray dried whole milk powder tends to float on top of the water or else forms insoluble masses or "globs" in the liquid. In any event, the powder is difficultly soluble even with vigorous shaking or agitation in a closed container. While it is exceedingly difficult to redisperse present whole milk powder in warm or hot water, it is virtually impossible to redisperse present fat containing powders in cold water.

Present nonfat dry milk solids are rendered more soluble in cold water than older powdered milk by various well known instantizing processes, but whole milk has never been made into a completely satisfactory instant product.

It has been proposed to treat instant nonfat dry milk solids with the fat portion of the milk to make an instant whole milk. When this product is dispersed in warm water, the fat tends to separate, and it is necessary to homogenize the mixture to produce a stable product. Another approach has been to emulsify the fat before adding it to the instant nonfat dry milk solids, however it has been necessary to add a surface active agent to this product to overcome feathering when it is added to coffee.

In any event, all of the known present whole milk powders must be reconstituted in warm water. This is undesirable, because warm tap water has a well known undesirable taste and if cold tap water is used, it must be warmed before adding the whole milk powder. This is bothersome and time consuming for the user and, since most whole milk is used for drinking, the reconstituted product then must be cooled before it is used.

One of the principal objects of the present invention is to provide a fat containing milk product, particularly a whole milk powder, which is easily and simply produced, which can be made into a product which is instantly dispersible in cold water, and which does not develop objectionable flavors, tastes or cake upon aging. Another object is to provide a whole milk powder which does not separate upon standing when reconstituted in cold water. Another object is to provide a simple economical process for making instant whole milk powder using conventional instantizing equipment.

Still another object is to provide an instantly soluble whole milk powder which can be reconstituted in cold water by stirring with a spoon. Another object is to provide a cold water soluble milk powder which when reconstituted forms a whole milk product which can be stored without separating. Another object is to provide a whole milk powder free of emulsifying agents, surfactants and other foreign materials.

These and other objects and advantages will become apparent hereinafter.

The present invention comprises a food product including a low melting fat containing milk powder which is easily soluble in cold water. The present invention comprises a process for making an instantly cold water soluble fat containing milk powder.

We have found that a new and improved whole milk powder which is instantly dispersible in cold water can be made by adding liquid butterfat or butter oil to condensed skim milk and homogenizing the mixture prior to spray drying and instantizing.

While the process and product described are applied to a milk product having a milk fat to milk solids ratio essentially the same as whole milk, the invention is not confined to instant whole milk, but is equally applicable to other fat containing milk products such as cream and low fat milk.

The butterfat portion of whole milk is composed of different components having different melting points. We have found that when the lower melting fractions of the butter oil are added to skim milk prior to drying and instantizing, the resultant dried whole milk powder is instantly soluble in water which is at a much colder temperature than heretofore possible for redispersing a whole milk powder.

Whole milk is accepted at a milk plant and separated into cream and skim milk as in the manufacture of normal nonfat dry milk. The skim is treated in the normal manner i.e., it is pasteurized or preheated to temperatures that kill the pathogenic organisms without affecting the spores and lactic acid bacteria, and the pasteurized skim is condensed in conventional vacuum pans to approximately 30% to 45% total solids.

The fresh cream contains approximately 40% butter oil which can be separated from the water by use of tergitol as described by Stein and Patton, J. Dairy Science 35: 655 (1952), or by any other convenient method.

The separated butter oil or fat portion is then separated into a high melting fraction and a low melting fraction. There are several suitable methods which give the desired results. The first method is fractional separation of the higher melting point components of the fat by controlled cooling and filtering. This method is used to remove undesirable fractions from mixed fats or mixed fatty acids in the preparation of oleo oil from internal fats and also in the preparation of winterized salad oils which do not cloud in the refrigerator, as well as in the preparation of other fats and oils.

The second method of separating the butter oil involves fractional crystallization of the higher melting point components of the fat from miscible solvents. A fractional crystallization process of this type is described in U.S. Patient No. 2,684,378.

The third method of obtaining a low melting fraction of butter oil involves molecular rearrangement of the fatty acids in the fat and substitution of short chain fatty acids to give a lower melting point fat. A molecular rearrangement process is described in U.S. Patent No. 2,684,377. This method offers the best possibility of reducing the melting point of the butter-fat without serious loss of material.

When regular whole milk containing unseparated butterfat is dried and the resulting whole milk powder is added to cold water below 100° F., the powder not only will not sink, but cannot even be stirred into solution with a spoon. It is necessary to separate the butterfat fraction having a cloud point below 85° F. to achieve a powder effectively dispersible in cold water. It is preferred that a butterfat fraction having a cloud point of about 60° F., or below be separated and made into whole milk powder, but any low melting fraction having components with a maximum melting point below 85° F., improves the reconstitutability of whole milk powder. The degree of improvement is related to the temperature of the powder as well as the temperature of the water used for reconstitution. The cloud point is defined as the temperature at which crystals begin to form as the oil is cooled.

After a low melting fraction of butterfat is separated or the fat modified to give a low melting fraction as hereinbefore discussed, it is mixed with condensed skim milk. The milk preferably is condensed to 40% solids, but may be from 30-45% condensed skim. The mixture is then homogenized, cooled and held for a period of time. The mixture is next spray dried in a conventional manner and the novel resultant low melting fat containing milk powder is instantized by any of the instantizing processes presently in use, such as the process described in U.S. Patent No. 2,832,686, or the process described in U.S. Patent No. 2,835,586. The resulting product is instantly dispersible in water of 60° F. or warmer without vigorous stirring or special reconstituting apparatus.

When the term "cold water" is used herein it is considered to mean water at a temperature below about 85° F. and preferably from about 60° F. to about 85° F.

In describing the present invention, reference will be made primarily to the instantizing process of U.S. Patent No. 2,832,868, but it is understood that other instantizing processes will also produce a satisfactory instant whole milk powder.

In the present invention, the dried whole milk powder containing a low melting butterfat fraction is substituted for the dried skim milk powder treated in the instantizing process described in U.S. Patent No. 2,832,686.

Briefly, the instantizing process includes the steps of instantly increasing the moisture content of the dried whole milk powder, from the normal 2-3½% to from 4-9%, preferably to about 5½%, with steam, followed by immediate drying with hot air to form the powder into coarse aggregated particles or agglomerates of loose porous structure. This loose porous structure, which can be described as "coral-like" or "sponge-like," readily wets because of its capillary action and readily dissolves or disperses in cold water when the powdered whole milk is reconstituted therein.

During the instantizing process, the whole milk powder is introduced into a "powder box" or drying chamber in a stream wherein the particles are positioned closely adjacent to one another. The particles are heated and wetted by releasing a stream of steam into the stream of particles while they are close together for instantly increasing the moisture content of the milk powder and for moistening the surface of each particle thereby causing the particles to stick together and forming agglomerates having large surface area per unit volume. The moisture content of the agglomerates is then instantly reduced by substantially immediately contacting the agglomerates with a hot gaseous stream passing adjacent to the area in which the particles are moistened, thereby forming instantly soluble agglomerates having a relatively large surface to volume and ready for immediate reconstitution in cold water.

The following example is typical of the process of this invention and the dry whole milk powder made thereby, but is not intended to limit the invention to the specific embodiment shown.

Example I

The butter oil is separated from 40% fresh cream by the use of tergitol as described by Stein and Patton, J. Dairy Science 35: 655 (1952). Two fractions are removed by cooling. The first fraction is removed with a lard press using a flannel sack as a filter. The remaining oil is reheated and cooled down to 83° F. The solid material is separated by filtering through cheesecloth. Six pounds of low melting fraction is obtained from 8 pounds of butter oil.

The six pounds of butter oil having a cloud point of 58.3° F. are combined with 37.25 pounds of 40% condensed skim milk. This mixture is homogenized at 2000 pounds per square inch at 160° F. and recirculated several times through the homogenizer in order to secure good homogenization. The mixture is then cooled down and held over night. The following day it is spray dried under the following conditions: Preheat 156° F., pressure on #69 jet was 600 pounds per square inch, box temperature was 194°-200° F. The product is instantized by the procedure of U.S. Patent No. 2,832,686. The yield is 12 pounds of powder of 3.8% moisture and 25.95% fat content, although some powder is lost during processing of this small experimental lot. The dried whole milk product has excellent instant milk properties, i.e., it readily disperses in cold water without vigorous stirring or special reconstitution apparatus.

Example I is described as a laboratory scale procedure using the fractional separation method of separating the low melting portion of the butter oil. Either fractional crystallization or molecular rearrangement of the fatty acids also produces satisfactory results. The process of Example I also can be used in pilot plant or full scale plant operations with similar success in producing an instantly soluble whole milk powder.

When a quantity of a conventional instantized whole milk powder is added to a glass containing water at a temperature below 100° F., the powder will not sink and cannot be stirred into solution with a spoon. However, when the instant whole milk powder produced in Example I is added to water at 60° F., it is readily dispersible with a spoon to form a reconstituted whole milk product of good taste which does not separate when stored.

This invention is intended to cover all changes and modifications of the examples of the invention herein chosen for purposes of the disclosure, which do not constitute departures from the spirit and scope of the invention.

What is claimed is:

1. A method of treating milk powder comprising subjecting a stream of closely positioned particles of a dried whole milk powder whose butter oil content has a melting point of below about 85° F. to the action of steam, immediately drying the resulting agglomerates, and recovering porous agglomerates which are instantly soluble in cold water to form reconstituted whole milk.

2. A method of producing whole milk powder having instant dispersibility in cold water comprising the steps of combining butter oil having a low melting point with condensed skim milk in the proportion found in whole milk, homogenizing the resultant mixture, drying the homogenized mixture to a moisture content of less than 4%, and forming the resultant dried milk particles into coarse agglomerates of loose porous structure having a relatively large surface in relation to volume and having instant dispersibility in cold water.

3. A method of producing an instantly dispersible fat-containing milk product comprising, separating whole milk into a cream portion and a skim portion, removing the water from the cream portion to give butter oil, separating the butter oil into a portion having a melting point below about 85° F., condensing the skim portion, combining the low melting fraction of the butter oil with the condensed skim, homogenizing the resultant mixture, drying the homogenized mixture, and forming the resultant dried fat containing milk particles into coarse agglomerates of loose porous structure which are instantly soluble in cold water.

4. A method for the manufacture of a fat containing dry food product which is readily dispersible in cold water to form a reconstituted fat containing milk product comprising, producing a stream of powder containing as the fat portion only the lower melting constituents, said stream having the particles of fat containing powder positioned closely adjacent to one another, heating and wetting said particles by releasing a stream of steam into said stream of particles while they are close together for instantly increasing the moisture content of the powder and for moistening the surface of each particle thereby forming agglomerates, and then instantly reducing the moisture content of the agglomerates by substantially immediately contacting the agglomerates with a hot gaseous stream passing adjacent to the area in which the particles are moistened thereby forming instantly cold water soluble fat containing agglomerates having a relatively large volume and ready for immediate use.

5. A method of producing whole milk powder comprising the steps of combining butter oil having a low melting point with condensed skim milk in the proportion found in whole milk, homogenizing the resultant mixture, and drying the homogenized mixture to produce a whole milk powder having a low melting fat portion.

6. The process described in claim 5 wherein the butter oil components have a cloud point of 60° F.

7. A method of producing whole milk powder comprising the steps of separating whole milk into a cream portion and a skim portion, removing the water from the cream portion to give butter oil, separating the butter oil into a portion having a melting point below about 85° F., condensing the skim portion, combining the low melting fraction of the butter oil with the condensed skim, homogenizing the resultant mixture and drying the homogenized mixture to produce a whole milk powder having a low melting fat portion.

8. A method of treating milk powder comprising subjecting a stream of closely positioned particles of a dried milk powder whose butter oil content has a melting point of below 85° F. to the action of steam, immediately drying the resulting agglomerates, and recovering porous agglomerates which are instantly soluble in cold water to form a reconstituted fat containing milk product.

9. A method of producing whole milk powder having instant dispersibility in cold water comprising the steps of combining butter oil having a cloud point of about 60° F. with condensed skim milk in the proportion found in whole milk, homogenizing the resultant mixture, drying the homogenized mixture to a moisture content of less than 4%, and forming the resultant dried milk particles into coarse agglomerates of loose porous structure having a relatively large surface in relation to volume and having instant dispersibility in cold water.

10. A method of producing whole milk powder having instant dispersibility in cold water comprising the steps of combining a fat portion having a low melting point of less than about 85° F. with condensed skim milk, homogenizing the resultant mixture, drying the homogenized mixture to a moisture content of less than 4%, and forming the resultant dried milk particles into coarse agglomerates of loose porous structure having a relatively large surface in relation to volume and having instant dispersibility in cold water.

11. A method of producing milk powder comprising the steps of combining a fat portion having a low melting point with condensed skim milk, homogenizing the resultant mixture, and drying the homogenized mixture to produce a milk powder having a low melting fat portion.

References Cited in the file of this patent

UNITED STATES PATENTS

| | | |
|---|---|---|
| 1,941,261 | Hellerud | Dec. 26, 1933 |
| 2,611,706 | Bernhart et al. | Sept. 23, 1952 |
| 2,911,300 | Peebles | Nov. 3, 1959 |